Sept. 24, 1974  S. J. SCHUSTER  3,837,972
PLASTIC BAG-MAKING MACHINE
Filed April 12, 1972
2 Sheets-Sheet 1
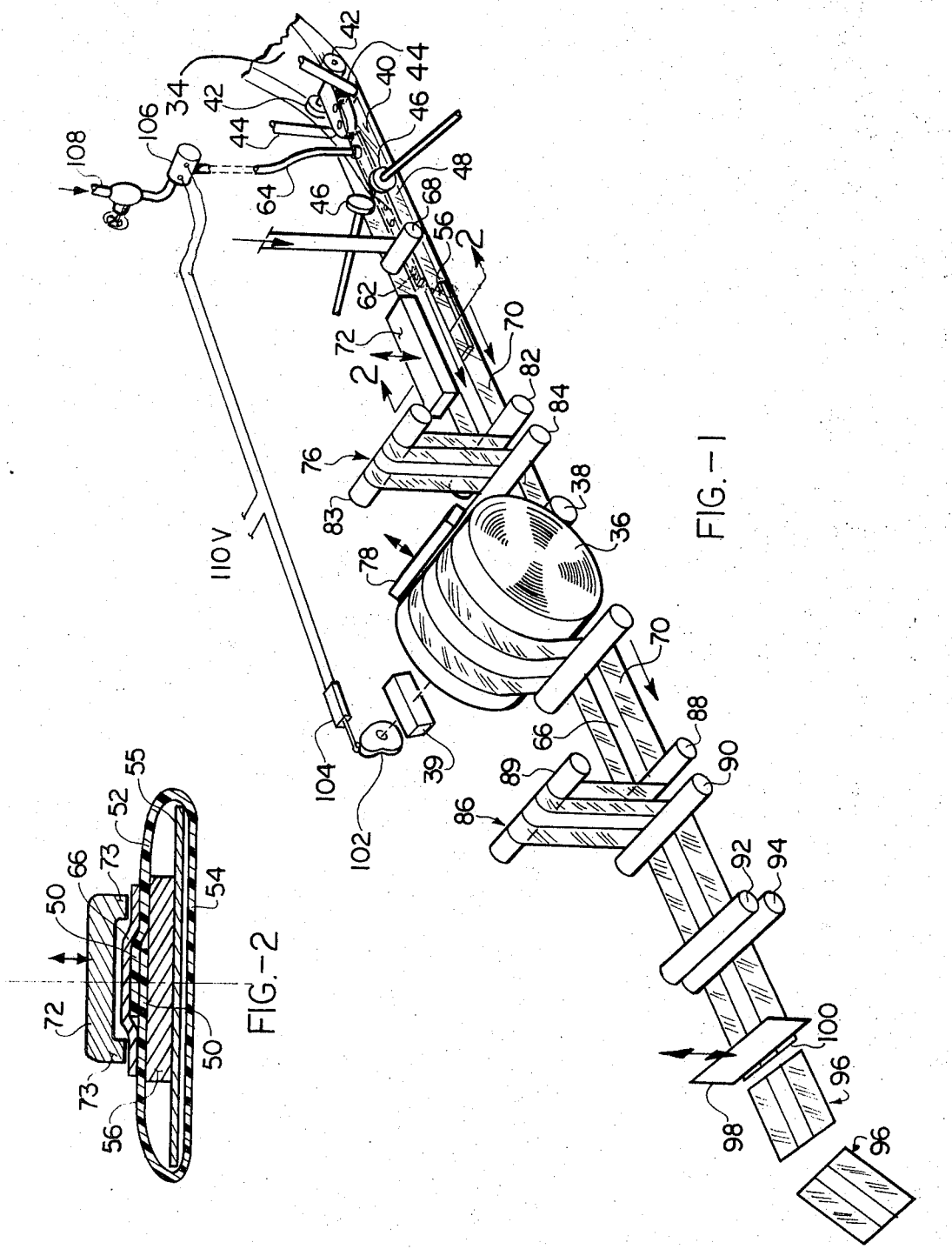

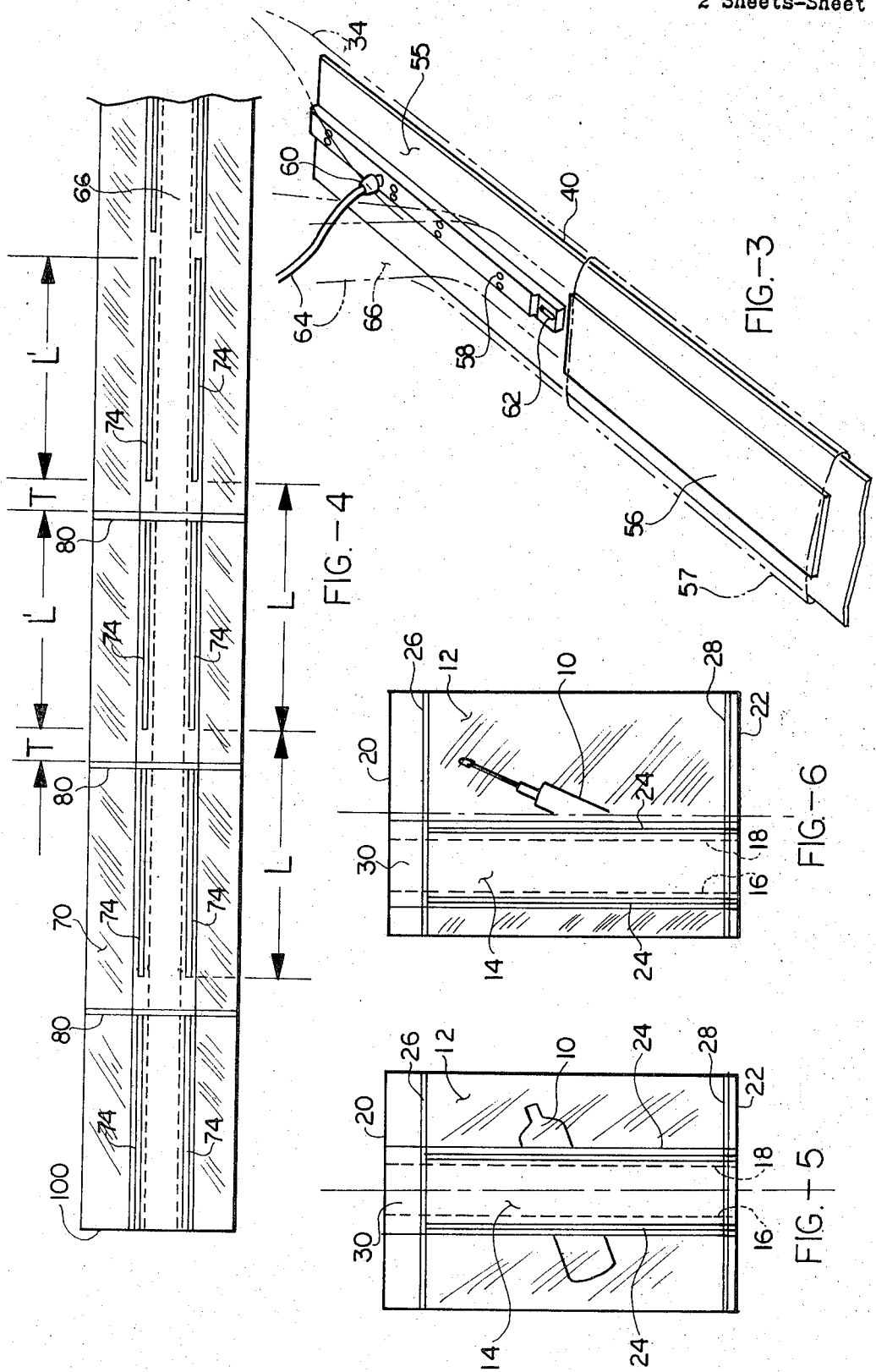

United States Patent Office 3,837,972
Patented Sept. 24, 1974

3,837,972
PLASTIC BAG-MAKING MACHINE
Samuel J. Schuster, 1099 Hillside St.,
Monterey Park, Calif. 91754
Filed Apr. 12, 1972, Ser. No. 243,393
Int. Cl. B29d 23/10; B30b 15/34
U.S. Cl. 156—466                3 Claims

ABSTRACT OF THE DISCLOSURE

An improved bag making machine is disclosed having a rotatable bag stock feed drum and employing a pressure heat seal means operatively associated with a plate mandrel about which the bag stock is formed. The plate mandrel includes an air conduit having an inlet port adapted to be intermittently connected to a supply of pressurized air in timed relation with the rotation of the feed drum. The air conduit further has an outlet port and the air intermittently discharging therefrom urges the bag stock away from the plate mandrel preventing the bag stock from sticking to the mandrel. The machine also includes roller compensator means between the feed drum and the plate mandrel to adjust the relative positions of transverse and longitudinal pressure heat seals.

BACKGROUND OF THE INVENTION (1) Field of the Invention

This invention relates generally to improvements in bag making machines employing plate mandrels as the bag forming element.

(2) The Prior Art

Bag machines of the type employing a plate mandrel about which a continuously advancing web of plastic material is folded and formed into flat, tubular bag stock have been known for several decades. One such machine is made by Simplex Packaging Machinery, Inc., Oakland, Calif. Generally, these machines comprise a table over which the web is drawn in intermittent fashion by means of a rotatable feed drum and feed roller combination. Guide means fold the web about the plate mandrel so that the portions of the web adjacent the longitudinal edges are brought into overlapping relationship. The tubular stock thus formed has a front face including the overlapping edge portions and a back face. A longitudinal pressure heat seal is applied during each dwell period to the overlapping portions of the bag. In this connection, the mandrel, which is interposed between the front and back faces of the bag, functions to prevent sealing of the faces to each other. The mandrel includes a rubber pad against which the heat seal bar presses and the portion of the mandrel supporting the pad may be enveloped in a Teflon or nylon coverlet to prevent sticking. After leaving the mandrel, the tubular bag stock is drawn between the feed drum and feed roller and around the feed drum where it may be subjected to a transverse seal defining an end of the bag. From the feed drum, the tubular bag stock moves through a cutter station where a reciprocating blade cuts the tubular stock into individual bags. The tubular stock is maintained under suitable tension by a pair of draw rolls. Located between the feed drum and the cutter station is an absorber or compensator mechanism comprising three idler rollers, the position of one of which is adjustable relative to the remaining two to obtain the proper cut-off position relative to the transverse seal.

U.S. Pat. 3,472,369 issued Oct. 14, 1969 to the inventor of the present invention and entitled "Readily Opened Package for Storing Items in Bacteria-Free Condition" discloses a bag fabricated of heat sealable plastic sheet essentially completely impermeable to bacteria. The sheet has longitudinal and transverse edges and is folded along longitudinal fold lines so that the longitudinal edges define a longitudinal access opening. A removable closure membrane of a material such as paper that is essentially completely impermeable to bacteria but highly permeable, in comparison to the plastic sheet, to sterilizing vapor, extends the length of the bag and closes the access opening. The closure membrane is secured to the exterior of the bag by a longitudinal, continuous pressure heat seal joinder line adjacent the access opening on each side thereof. Continuous heat seal joinder lines extend along the transverse edges closing the bag and further uniting the membrane to the faces of the plastic bag along the transverse edges.

One of the problems associated with the manufacture of the above-described bag structure on the machines of the prior art is that because of the high sealing pressure required there is a tendency for the front face of the bag to adhere to the plate mandrel along the longitudinal heat seals. When the tubular bag stock is next advanced by the feed drum, such sticking results in stretching or distortion of the bag material before it can be pulled loose and in more aggravated cases tearing of the bag material results. In any event, the loss of material which results greatly reduces the ability to manufacture the described bags on an economical, commercially feasible basis.

Another drawback of existing bag making machines is that the adjustability of the position of the transverse seal relative to the position of the longitudinal seal not only is limited but requires shifting of the transverse and/or longitudinal heat seal bars, a relatively tedious, time consuming process.

SUMMARY OF THE INVENTION

In accordance with an exemplary embodiment of one aspect of the invention, the plate mandrel includes an air conduit having an inlet port adapted for intermittent connection to a supply of pressurized air and an outlet port positioned within the confines of the tubular bag stock formed about the plate mandrel. Air is admitted to the inlet port during the portion of the dwell period immediately following application of the longitudinal heat seals and cut off before the feed drum is actuated to advance the bag stock. The air discharging from the outlet port during this brief interval tends to inflate the bag stock and urges it away from the plate mandrel. Any portions of the bag stock stuck to the mandrel are thereby pulled away from the mandrel.

Pursuant to another aspect of the invention, the bag stock is passed through a second, three-roller compensator mecahnism positioned between the longitudinal heat seal station and the feed drum. The position of the longitudinal heat seals relative to the transverse seals may thereby be precisely adjusted.

BRIEF DESCRIPTION OF THE DRAWINGS

Further objects, advantages and features of the present invention will become clear from the detailed description of the preferred embodiment, below, when read in conjunction with the accompanying drawings, in which:

FIG. 1 is a schematic representation, in perspective, of a bag making machine incorporating features of the present invention;

FIG. 2 is a cross-section view of a portion of the machine of FIG. 1 as seen along 2—2;

FIG. 3 is a perspective view of the plate mandrel employed in the machine of FIG. 1;

FIG. 4 is a plan view of the development of a portion of the tubular bag stock formed by the machine of FIG. 1; and FIGS. 5 and 6 are front views of two types of bags which may be fabricated on the machine of FIG. 1.

DETAILED DESCRIPTION OF THE PREFERRED EMBODIMENT

The improved bag making machine of the present invention may be used for forming disposable bags of the type shown in FIGS. 5 and 6 and described in greater detail in the above-referenced U.S. Pat. No. 3,472,369. Such bags may be used for storing an article 10 in bacteria-free condition and comprise generally a main portion 12 of heat sealable plastic sheet essentially completely impermeable to bacteria and a removable closure membrane 14 of a material, such as paper, that is essentially completely impermeable to bacteria but highly permeable. in comparison to the plastic sheet, to sterilizing vapor. The bag has longitudinal edges 16 and 18, the margins adjacent these edges being in overlapping relationship and defining a longitudinal access opening through which the article 10 is withdrawn. Transverse edges 20 and 22 define the ends of the bag. The closure membrane 14 is bonded to the front face of the bag by longitudinal pressure heat seal joinder lines 24 and the ends of the bag are closed by transverse pressure heat seal joinder lines 26 and 28. The transverse seal 26 is preferably spaced a sufficient distance from the transverse edge 20 so as to define a pull tab 30 along one end of the closure membrane 14.

The bag is manufactured on the machine of the invention without the heat seal 28 so that one end of the bag is left open for receiving the article 10. After the article is inserted, the seal 28 is applied either manually or automatically as a secondary operation on a "form and fill" machine combining the bag fabrication, filling and sealing functions. The filled bag is then exposed to a sterilizing vapor such as ethylene oxide or steam which permeates through the closure membrane and sterilizes the interior surfaces of the bag and the article 10. Next, the sterilizing vapor is purged from the bag by applying a partial vacuum and the bag is then stored until the stored article 10 is ready for use. Opening of the bag is accomplished by grasping the tab 30 of the closure membrane 14 and pulling the membrane away from the plastic portion of the bag thereby exposing the access opening through which the article 10 is withdrawn.

Turning now to FIGS. 1–3, in the bag making machine forming the subject matter of this invention, the bags are formed from a continuous web 34 of sheet plastic such as polyethylene, polypropylene, nylon, polybutylene, mixtures of polyethylene and polypropylene, or the like drawn from a suitable supply roll (not shown) and maintained under the required tension. The web 34 is intermittently advanced a distance equal to the length of one bag by means of an intermittently rotatable feed drum 36 that coacts with a feed roller 38 biased toward the drum 36. The drum 36 is actuated by a drive unit 39.

As it advances, the web 34 is folded in well-known fashion about a plate mandrel 40 by the action of forming rollers 42, forming fingers 44 and folding rollers 46. The web 34 is thus formed into a continuous tube or sleeve 48 with the longitudinal margins 50 of the web being disposed in overlapping relation. The sleeve 48 thus envelopes the plate mandrel 40 which is interposed between the front face 52 and back face 54 of the sleeve, the front face 52 lying along the upper surface 55 of the mandrel and including the overlapping margins 50.

The plate mandrel 40 includes a rubber pad 56 which may be covered by a nylon film 57. The length of the pad 56 determines the length of the longitudinal heat seals. An air conduit 58 is attached to the upper surface 55 of the mandrel. The conduit 58 may simply comprise a hollow steel bar riveted to the plate mandrel and includes an air inlet port 60 and an air outlet port 62 adjacent the end of the conduit nearest the rubber pad 56. A tube 64 is connected to the inlet port 60.

The removable closure membrane 66 is fed from a supply roll (not shown) as a continuous strip around a roller 68 and into contact with the front face 52 of the plastic sleeve 48 and over the overlapping margins 50. The sleeve 48 and closure membrane strip 66 together form the tubular bag stock 70 which is eventually cut into individual bags. The outlet port 62 is located sufficiently downstream of the sleeve-forming elements 42, 44, and 46, 50 so that it is positioned within the confines of the tubular bag stock 70. In this way, air discharging from the port 62 will effectively act on the interior surfaces of the bag stock to urge the stock away from the plate mandrel 40.

During each dwell between successive feeds of the bag stock 70, a longitudinal heat sealer 72 having double bars 73 is operated to join the strip 66 and front face 52 by means of a pressure heat seal joinder line 74 applied along each side of the overlapping margins 50. The heat seals 74 have a length L' equal to that of the rubber pad 56 and, as best shown in FIG. 4, are separated longitudinally by a distance T equal to the desired length of the pull tab 30. The length L shown in FIG. 4 is the total length of the individual bags and is equal to the sum of the lengths L' and T. During each period of rotation of the feed drum 36, the tubular bag stock 70 is, of course, advanced a distance L.

From the longitudinal heat seal station, the tubular bag stock 70 passes about a compensator mechanism 76, then between the feed drum 36 and feed roller 38 and around the feed drum. During each dwell period, a transverse heat seal bar 78 is operated to apply a transverse heat seal 80 that joins the strip 66 and the faces 52 and 54. The transverse heat seal 80 crosses one extremity of the longitudinal heat seals 74, as best shown in FIG. 4.

The placement of the longitudinal seals 74 relative to the transverse seals 80 is controlled by the compensator mechanism 76 which comprises three rollers 82–84. The upper roller 83 is movable vertically relative to the rollers 82 and 84 thereby providing a precise adjustment of the distance along the tubular bag stock 70 between the transverse and longitudinal heat sealers.

After leaving the feed drum 36, the tubular bag stock is threaded through a second compensator mechanism 86, comprising rollers 88–90 and between draw rollers 92 and 94 which maintain the bag stock leaving the feed drum 36 under an appropriate level of tension. Once past the draw rollers 92 and 94, the bag stock 70 is separated into individual bags 96 by a reciprocating mechanical or thermal cutter 98 operable during each dwell period. As shown in FIG. 4, the bag stock is cut along lines 100 which just intercept the extremities of the longitudinal seals 74 opposite the transverse seals 80. The exact position of the cut lines 100 is controlled by the compensator mechanism 86.

Connected to the drive unit 39 is a cam 102 for actuating a microswitch 104. The switch 104 is electrically coupled to energize a solenoid valve 106 whose inlet is attached to a source of pressurized air by a conduit 108. The outlet of valve 106 is connected to the tube 64. The cam 102 is shaped and positioned so that the switch 104 is closed in timed relation with the intermittent movement of the bag stock 70. Specifically, the switch 104 is closed to energize the valve 106 and admit air under pressure to the conduit 58 immediately following the application of the longitudinal seals 74 and retraction of the longitudinal heat sealer 72, but before the feed drum is actuated to advance the bag stock 70. The air issuing from the outlet port 62 thereby tends to inflate the bag stock, urging it away from the plate mandrel 40. In the event the bag stock is stuck to the plate mandrel due to the action of the heat sealer, it is thereby separated from the mandrel so that it may be advanced unimpeded and without damage.

What is claimed is:

1. In a machine for making bags from a continuous plastic web received from a web supply, said bags being of the type having a front face, a back face, transverse ends, longitudinal edges defining a longitudinal access opening in said front face, a removable closure membrane extending the length of the bag and closing said access opening and secured to said front face by a longitudinal pressure heat seal joinder line adjacent said access opening on each side thereof and a transverse pressure heat seal uniting said closure membrane and said front and back faces along an end of said bag, said machine including a plate mandrel, means for folding longitudinal edge margins of said web over said mandrel to bring said margins in overlapping relation to form a continuous, plastic sleeve, means for concurrently feding a continuous strip of said closure membrane material into contact with said front face along said overlapping margins, said sleeve and closure membrane strip comprising continuous tubular bag stock, means for intermittently advancing said tubular stock including drive means, a feed drum adapted to be intermittently rotated by said drive means and having a dwell period, longitudinal pressure heat seal means operatively associated with said plate mandrel and actuated during each dwell period of said feed drum to join said strip and the front face of said bag, transverse heat seal means operatively associated with said feed drum for joining said strip and said front and back faces of said bag along an end of said bag, said plate mandrel having an upper surface and including air conduit means disposed along said upper surface, said conduit having an inlet port connected through a valve to a supply of pressurized air, said valve being responsive to said drive means to open only during the portion of said dwell period following application of said longitudinal heat seal and retraction of said longitudinal heat seal means but before the feed drum is next advanced, said conduit further having an outlet port in communication with said inlet port and positioned on the upper surface of said plate mandrel along the longitudinal center line thereof and between said longitudinal heat seal means and said web supply and within the confines of said tubular bag stock, the air discharging intermittently from said outlet port urging said tubular bag stock away from said plate mandrel.

2. In a machine, as defined in claim 1, the further improvement including compensator means positioned between said plate mandrel and said feed drum, said compensator comprising three idler rollers, the position of at least one of which is adjustable relative to the remaining rollers to adjust the position of the longitudinal seals along said tubular bag stock relative to the transverse seal.

3. In a machine, as defined in claim 1, in which said inlet port is connected to a solenoid valve which controls the admission of air from said air supply to said inlet port, said valve being energized by switch means responsive to the position of a cam driven by said drive means.

References Cited
UNITED STATES PATENTS

| | | | |
|---|---|---|---|
| 3,068,133 | 12/1962 | Cilker et al. | 156—289 |
| 3,446,691 | 5/1969 | Mundie | 156—466 |
| 3,676,270 | 7/1972 | Lehmacher et al. | 156—515 |
| 3,399,094 | 8/1968 | Skoggard et al. | 156—466 |
| 2,614,349 | 10/1952 | Barnes | 156—201 |
| 3,472,369 | 10/1969 | Schuster | 229—66 |
| 2,169,936 | 8/1939 | Wagner | 156—466 |
| 2,732,882 | 1/1956 | Kuts | 156—467 |
| 3,042,103 | 7/1962 | McDevitt et al. | 156—203 |
| 3,650,873 | 3/1972 | Smith et al. | 156—515 |
| 3,717,536 | 2/1973 | McVay et al. | 156—466 |
| 2,587,422 | 2/1952 | Wills | 156—497 |
| 3,775,222 | 11/1973 | Aspin et al. | 156—203 |

CHARLES E. VAN HORN, Primary Examiner

B. J. LEWRIS, Assistant Examiner

U.S. Cl. X.R.

93—82; 156—467, 497, 554, 583